United States Patent [19]

Vallelonga, Sr. et al.

[11] Patent Number: 5,612,997
[45] Date of Patent: Mar. 18, 1997

[54] OFF-HOOK DISCONNECT AND RECONNECT RINGER DEVICE

[76] Inventors: Kenneth M. Vallelonga, Sr., 130 Oak St., Laurel Valley; James W. Allman, Rte. 4 Box 503, both of Clarksburg, W. Va. 26301

[21] Appl. No.: 523,464

[22] Filed: Sep. 5, 1995

Related U.S. Application Data

[63] Continuation-in-part of Ser. No. 382,523, Feb. 2, 1995.

[51] Int. Cl.$^6$ ............... H04M 3/14; H04M 1/24
[52] U.S. Cl. ............... 379/393; 379/32; 379/373; 379/377; 379/387
[58] Field of Search ............... 379/373, 375, 379/208, 32, 33, 80, 187, 387, 393, 377, 418

[56] References Cited

U.S. PATENT DOCUMENTS

| | | | |
|---|---|---|---|
| 2,771,511 | 11/1956 | Morris, Jr. | 379/187 |
| 3,150,237 | 9/1964 | Baldik et al. | 379/387 |
| 3,919,487 | 11/1975 | Gabrielson | 379/187 |
| 4,109,112 | 8/1978 | Denman et al. | 379/399 X |
| 4,405,839 | 9/1983 | Groff | 379/442 X |
| 4,480,154 | 10/1984 | Klee | 379/373 |
| 4,747,125 | 5/1988 | Buchberger et al. | 379/80 X |
| 4,903,291 | 2/1990 | Tsurufuji et al. | 379/389 X |
| 4,922,529 | 5/1990 | Kiel | 379/387 |
| 4,998,271 | 3/1991 | Tortola et al. | 379/32 |
| 5,317,626 | 5/1994 | Jaynes et al. | 379/67 |
| 5,390,249 | 2/1995 | Park | 379/393 |
| 5,479,501 | 12/1995 | Lai | 379/377 |

*Primary Examiner*—Ahmad F. Matar
*Assistant Examiner*—T. Devendra Kumar

[57] ABSTRACT

An off-hook disconnect and reconnect ringer device will detect if a telephone is off-hook and will receive incoming telephone calls through the off-hook telephone. The off-hook disconnect and reconnect ringer device includes at least one relay, an audio amplifier or first transistor, a switch or second transistor, a timer, a first comparator, a second comparator, a relay driver or third transistor, and a ringer device. The off-hook disconnect and reconnect ringer device may be integrally formed with the telephone or may be connected to the telephone by at least one wire. During operation of the device, if an audio signal is not detected, then the timer is actuated and begins to time the period of time that the telephone is off-hook. After a preset period of time, the relay temporarily disconnects the telephone from the telephone line, allowing the off-hook disconnect and reconnect ringer device to signal through the ringer device that an incoming call is being received, even though the telephone is off-hook. The first comparator detects voltage for enabling the telephone to be reset for normal usage of the telephone. The off-hook disconnect and reconnect ringer device may include a plurality of integrated circuits for detecting tones and a NOR gate. If the telephone is off-hook, when the off-hook disconnect and reconnect ringer device detects a tone produced by the telephone company, the telephone is disconnected from the telephone line. Incoming calls will activate the ringer device, signaling a person to answer the telephone.

7 Claims, 6 Drawing Sheets

OFF-HOOK DISCONNECT AND RECONNECT RINGER DEVICE

This is a Continuation-in-part of U.S. application Ser. No. 08/382,523 filed Feb. 2, 1995, pending.

BACKGROUND OF THE INVENTION

The invention relates to telephones and, more particularly, to the detection of an off-hook telephone and the receiving of an incoming telephone call through the disconnected telephone.

Occasionally, a telephone may become disconnected from an incoming telephone line, often referred to as being "off-hook", preventing any incoming telephone calls from being received and any outgoing telephone calls from being transmitted. For example, a receiver of the telephone may be accidently left off of the hook, the receiver may be knocked off of the hook by a small child, or depending on the type of telephone, the On/Off button of the receiver may have been accidentally pressed.

Currently, many telephone companies provide the service of transmitting a tone through the telephone line to be heard through the receiver of an off-hook telephone after a certain period of time of disconnection, to notify a person that their telephone is disconnected. Some telephone companies convey a first tone, a second louder tone, and a recorded message which may be heard through the receiver. However, the tones and message are transmitted for a only certain length of time, after which the receiver is silent and the telephone is disconnected from the telephone line. If a person is not near the receiver and does not hear the tones or message, the person will not be notified to hang up the telephone or re-connect the telephone to the incoming telephone line.

An off-hook detection circuit for detecting when a telephone has been taken off the hook is disclosed in U.S. Pat. No. 5,317,626 issued May 31, 1994 to Jaynes et al. and emitled "Wake-Up and Reminder System for a Telephone". The system includes a first relay for disconnecting the telephone from the telephone line, an off-hook detection means, and a second relay for disconnecting the telephone from a ringing device and connecting the telephone to a recorder which plays a pre-recorded message. However, when the off-hook detection circuit detects that the telephone has been taken off the hook, the second relay disconnects the telephone from the ring line and incoming calls cannot be received.

Therefore, what is needed is an apparatus and method for receiving incoming calls even if the telephone has been disconnected from the telephone line.

SUMMARY OF THE INVENTION

An off-hook disconnect and reconnect ringer device for a telephone includes means for detecting if the telephone is off-hook and means for receiving telephone calls through an off-hook telephone. The means for detecting includes a switch for controlling the off-hook disconnect and reconnect ringer device and a timer connected to the switch for timing a period of time and producing an output. A first comparator is connected to the switch and to the telephone line for detecting a voltage received through the telephone line and triggering the switch. A second comparator is connected to the timer for comparing a preset reading of the second comparator with the output of the timer and producing a signal.

The means for receiving telephone calls includes a relay connected between the telephone and the telephone line for disconnecting and connecting the telephone and the telephone line and a ringer device connected between the relay and the telephone line for signaling that the off-hook disconnect and reconnect ringer device is receiving an incoming telephone call.

The off-hook disconnect and reconnect ringer device further may include means for connecting the off-hook disconnect and reconnect ringer device to the telephone and means for connecting the off-hook disconnect and reconnect ringer device to a telephone line. The disconnect and reconnect device may also include a bridge, a transformer, an audio amplifier or transistor, a detector circuit, a hold circuit, at least one control, at least one defeat switch, and a power supply.

An alternative embodiment of the off-hook disconnect and reconnect ringer device includes the means for detecting having at least one integrated circuit for decoding frequencies transmitted through the off-hook telephone, a NOR gate connected to the integrated circuit for producing a signal, and the timer connected to the NOR gate for receiving the signal from the NOR gate and timing a period of time. A voltage divider may be connected between the transformer and the integrated circuit, a voltage regulator may be connected to the power supply, and the integrated circuits may include means for adjusting the frequency to be detected.

The off-hook disconnect and reconnect ringer device may be a device connected to a telephone or may be integrally formed with the telephone, an answering machine, or the like. A separate disconnect and reconnect device may be attached to each telephone or the disconnect and reconnect device may have a plurality of inputs for installing several telephones onto a single off-hook disconnect and reconnect ringer device.

A method for detecting if a telephone is off-hook and receiving telephone calls through a disconnected telephone, includes the steps of detecting an audio signal, timing a period of time of no detection of the audio signal, comparing the period of time with a preset period of time for producing an output indicating that the telephone is off-hook, and disconnecting the off-hook telephone. A signal is produced for an incoming telephone call through the disconnected telephone. The method further includes detecting a voltage received through the telephone line, comparing the voltage with a preset voltage for producing an output indicating that the telephone is on the hook, and reconnecting the disconnected telephone.

BRIEF DESCRIPTION OF THE DRAWINGS

While the specification concludes with claims particularly pointing out and distinctly claiming the subject matter of the invention, it is believed the invention will be better understood from the following description, liken in conjunction with the accompanying drawings, wherein:

DESCRIPTION OF THE PREFERRED EMBODIMENT

The invention described herein provides an apparatus and method for detecting when the telephone has been disconnected from the telephone line, i.e. the telephone has been taken off of the hook, and for receiving incoming calls whether or not the telephone in connected or disconnected from the telephone line.

Figure 1:
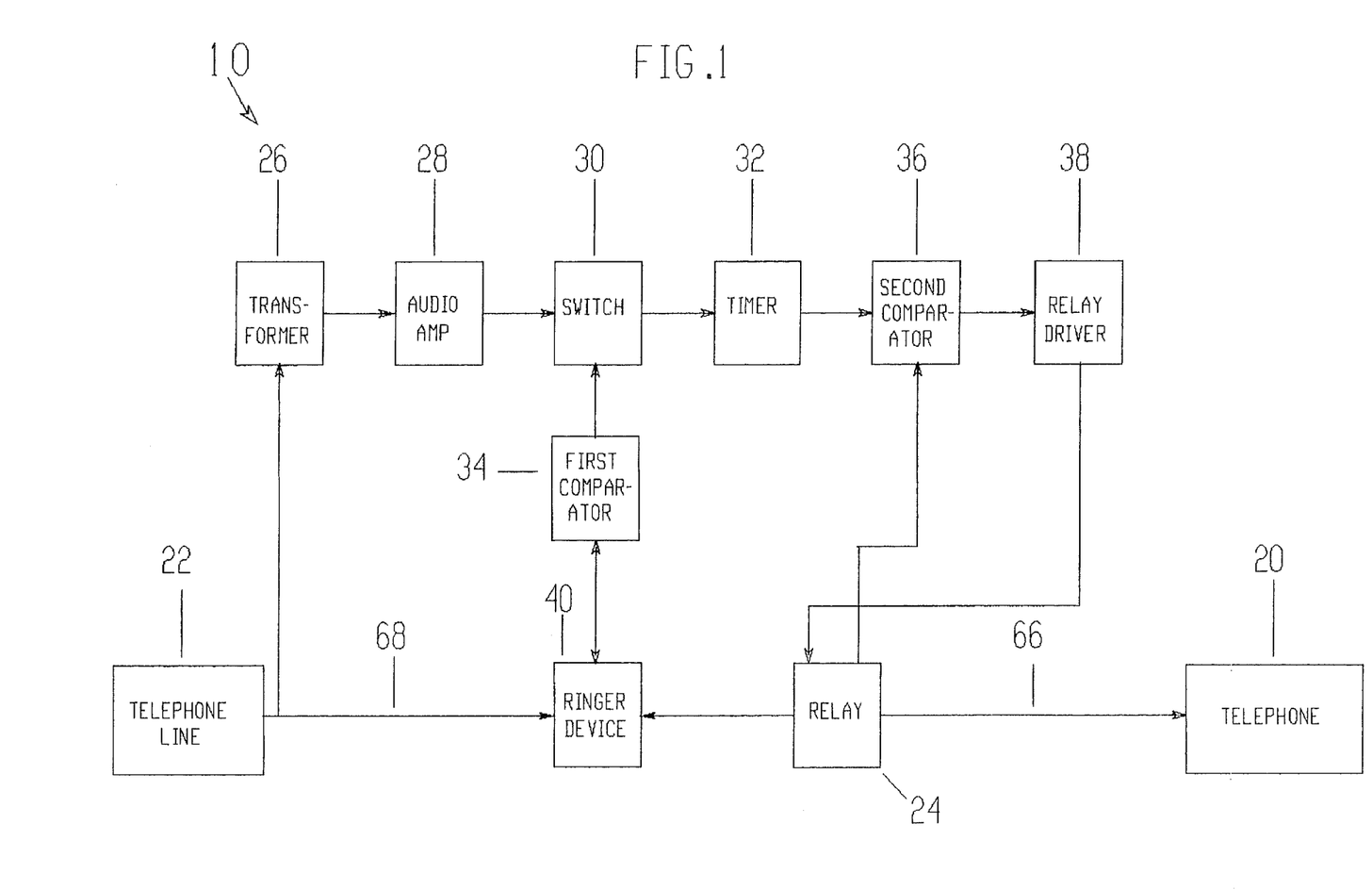
FIG. 1 is a block diagram of an off-hook-disconnect and reconnect ringer device.

Referring to FIG. 1, an off-hook disconnect and reconnect ringer device 10 which is compatible with existing telephone technology is connected to a telephone 20 and to telephone line 22 which supplies telephone service from the telephone company to a customer. The off-hook disconnect and reconnect ringer device 10 detects if the telephone 20 is off-hook and receives incoming telephone calls which cannot be received through the off-hook telephone 20.

The off-hook disconnect and reconnect ringer device 10 includes a relay 24, which connects or disconnects the telephone 20 from the telephone line 22. If the off-hook disconnect and reconnect ringer device 10 detects that the telephone 20 is off-hook, then the relay 24 disconnects the telephone 20 from the telephone line 22 and connects various components of the off-hook disconnect and reconnect ringer device 10, to be discussed hereinbelow, to the telephone line 22. The relay 24 may also be reset to reconnect the telephone 20 with the telephone line 22 for normal operation of the telephone 20, such as by pressing a receiver button on the telephone.

The off-hook disconnect and reconnect ringer device 10 includes a transformer 26 connected to the relay 24 and telephone line 22. The transformers 26 is connected to a first transistor, such as an audio amplifier 28, which receives an audio signal, such as a voice being transmitted through the telephone line 22, and amplifies the signal or voice conversation for preventing the relay 24 from disconnecting the telephone 20 while the telephone 20 is in use.

A second transistor, such as a switch 30, is connected to the audio amplifier 28 for controlling a timer 32 and a second comparator 36. If the switch 30 is OFF, such as no detection of an audio signal, then the timer 32 begins to time the length of quiet time, which is the period of silence when a telephone is off-hook or the time that an audio signal is not received. The timer 32 is connected to the second comparator 36 which compares a preset value with the timer 32 reading. Depending on the comparison, the switch 30 may turn ON a third transistor, such as a relay driver 38, which is connected to the switch 30. When ON, the relay driver 38 energizes the relay 24, which disconnects the telephone 20 from the telephone line 22.

If the switch 30 is ON, such as during a telephone conversation, then the switch 30 acts as a dead short across the timer 32 and the telephone 20 remains connected to the telephone line 22.

A first comparator 34 is connected to the switch 30 and detects an increase voltage through the telephone line 22, for example, when a telephone is on the hook as compared to off-hook. The detection of an increase in voltage turns the switch 30 ON, resetting the timer 32, which keeps the telephone 20 from being disconnected while on the hook, but the telephone 20 will remain disconnected to allow a signaling device, such as ringer device 40, to operate as long as the telephone is off the hook.

The off-hook disconnect and reconnect ringer device 10 includes the ringer device 40 connected to the relay 24 and telephone line 22. When he relay 24 has disconnected the telephone 20 from the telephone line 22, an incoming telephone call will actuate the ringer device 40 to signal to a person to answer the telephone 20. The ringer device 40 may be a piezo buzzer, bell, extension bell, or the like for providing a means for signaling that the telephone has an incoming call.

To operate the off-hook disconnect and reconnect ringer device 10, the off-hook disconnect and reconnect ringer device 10 is connected to a power supply 42, such as a 12 volt wall jack, for providing the proper voltage for the various components of the off-hook disconnect and reconnect ringer device 10. In the event of a power failure, the off-hook disconnect and reconnect ringer device 10 will not function, however, the telephone will operate, if the telephone is not off-hook. Alternatively, a battery pack may be used as a back-up.

For the various embodiments of this invention, the same reference characters will be used to designate like parts. In addition, like functions and like interactions of the parts among the various embodiments of this invention will not be repeated for each embodiment.

Figure 2:
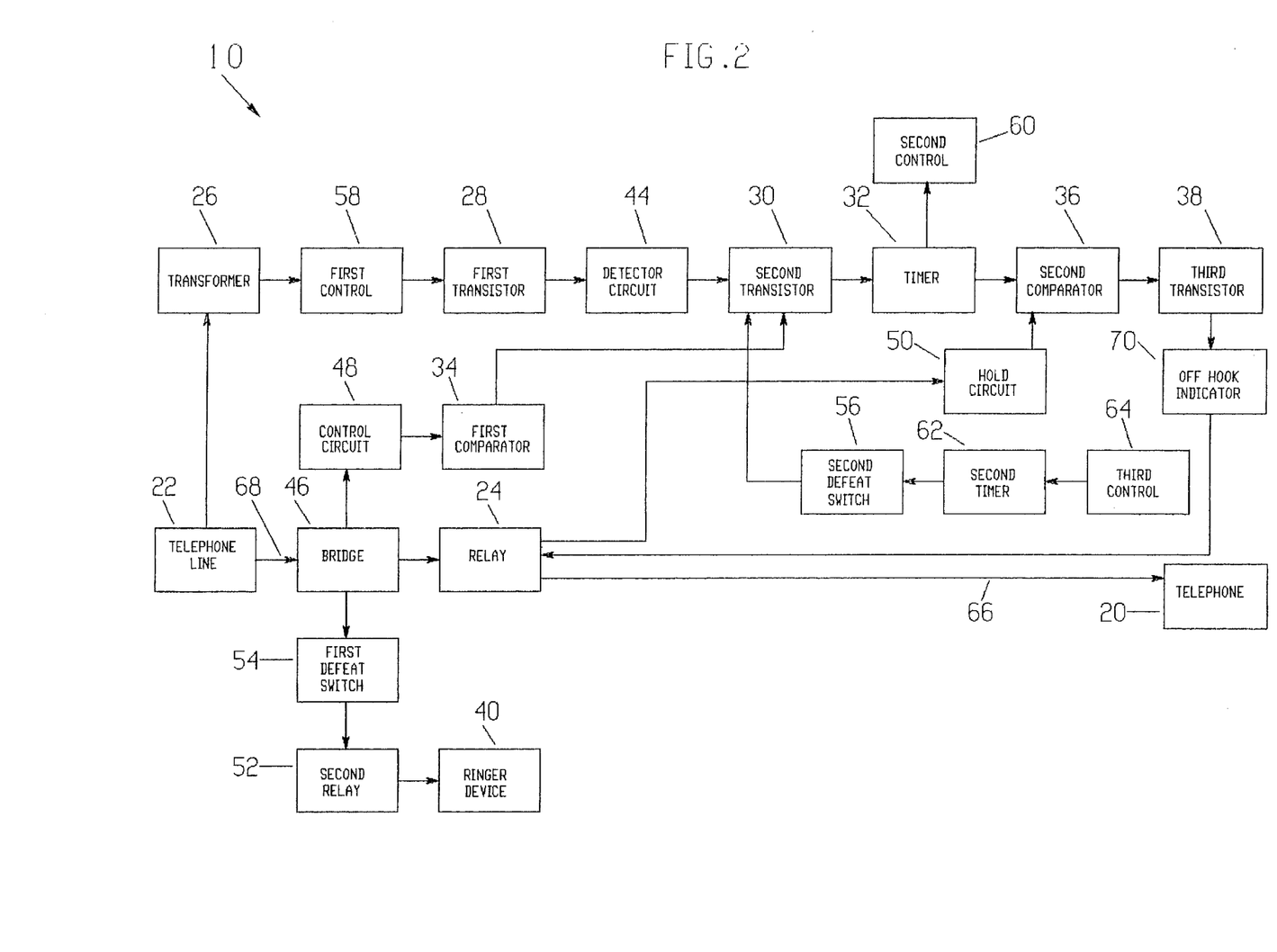
FIG. 2 is a block diagram of an alternative embodiment of the off-hook disconnect and reconnect ringer device.

Referring to FIG. 2 and using the same reference characters to define like parts, the off-hook disconnect and reconnect ringer device 10 additionally includes a detector circuit 44 connected to the audio amplifier 28 and to the switch 30 for detecting audio signal and converting the audio signal to a voltage.

A bridge 46 is connected between the relay 24, the ringer device 40, and telephone line 22 for maintaining the proper voltage polarity. A control circuit 48 is connected between the first comparator 34 and the bridge 46. The relay 24 is connected to a hold circuit 50 for holding the relay 24 latched in a position in which the telephone 20 is disconnected from the telephone line 22.

An off-hook indicator 70 may provide a signal whether or not the telephone is connected or disconnected. A second relay 52 may be attached to the ringer device 40 for preventing the ringer device 40 from being actuated when the telephone 20 is connected to the telephone line 22. Utilization of the second relay 52 allows the ringer device 40 to actuate only when the telephone 20 is disconnected or off-hook.

A first defeat switch 54 is connected to the ringer device 40 for disengaging the ringer device 40 so that the ringer device 40 does not produce a signal for an incoming telephone call. For example, a person may wish to not receive any incoming calls.

A second defeat switch 56 is connected to the switch 30 for turning on and off the off-hook disconnect and reconnect ringer device 10. For example, to put a person on hold for a certain period of time, the off-hook disconnect and reconnect ringer device 10 could be turned off to prevent the telephone 20 from being disconnected from the telephone line 22 during the quiet time, i.e. to prevent the off-hook disconnect and reconnect ringer device 10 from interpreting the quiet time as the telephone being off-hook.

A first control 58 is connected to the audio amplifier 28 for providing a means for a person to adjust the amplification of the audio signal to compensate for soft and loud speaking persons. A second control 60 is connected to the timer 32 for adjustment of the length of time that the telephone 20 is off-hook before the off-hook disconnect and reconnect ringer device 10 disconnects the telephone 20 from the telephone line 22.

A second timer 62 is connected to the second defeat switch 56 for resetting the defeat switch 56 in the event that the second defeat switch 56 is inadvertently left in the OFF position, to re-activate the off-hook disconnect and reconnect ringer device 10. A third control 64 is connected to the second timer 62 for adjusting the length of time that the second defeat switch 56 may remain in the OFF position.

Figure 3:
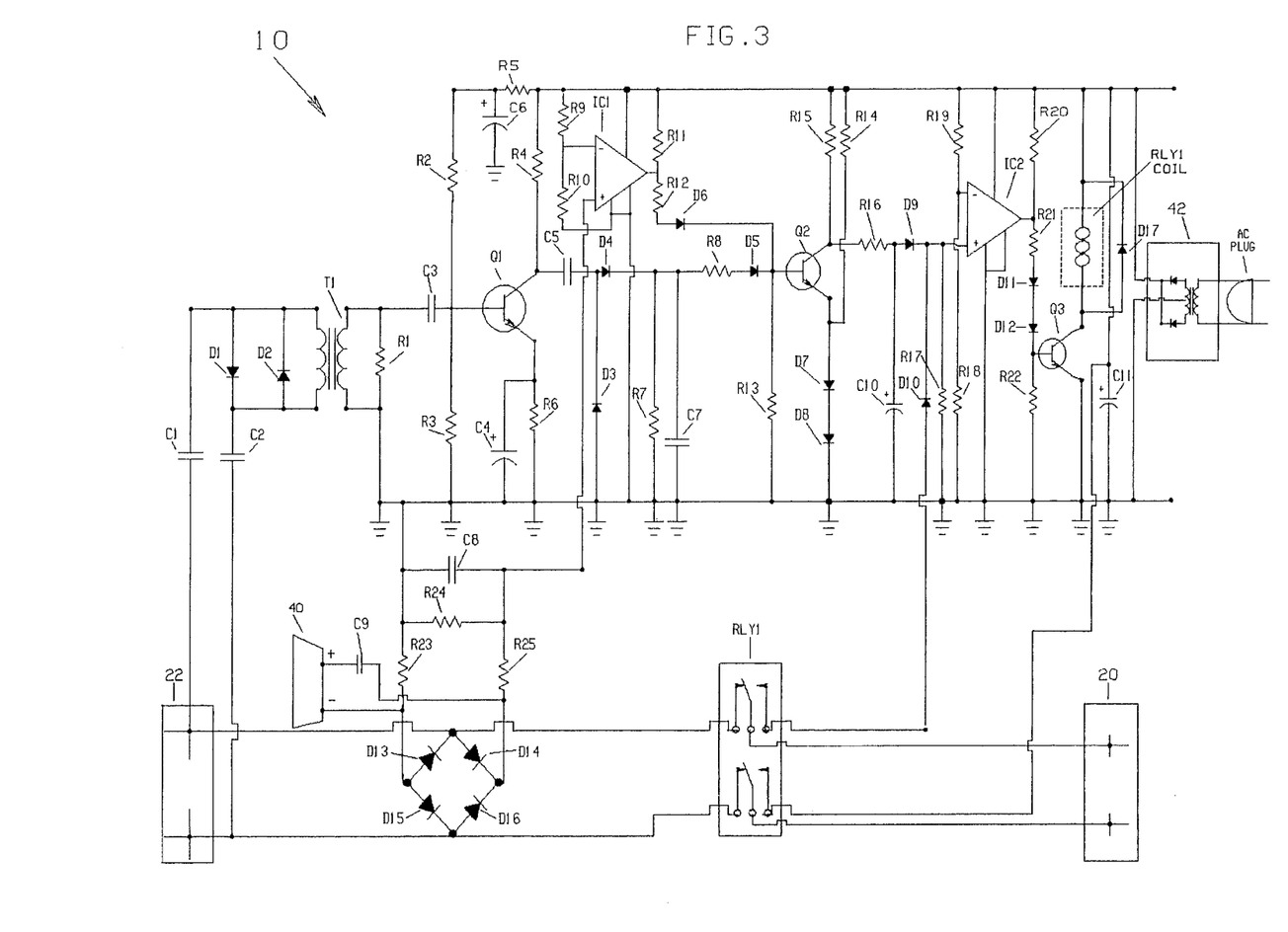
FIG. 3 is a schematic diagram of the off-hook disconnect and reconnect ringer device.

FIG. 3 schematically illustrates one embodiment of the off-hook disconnect and reconnect ringer device 10. The relay 24 may be a relay RLY1, which may disconnect the telephone 20 after the telephone has been off-hook for a certain period of time, such as for approximately 3½ minutes. The audio amplifier 28 may be a transistor Q1 which is coupled to the telephone line 22 by the transformer 26, such as transformer T1 and capacitors C1 and C2. As an example, the transistor Q1 may be a Class A audio amplifier, including resistors R2, R3, R4, R6, and capacitors C3 and C4.

The transistor Q1 is connected to the detector circuit 44, which includes capacitors C5 and C7, diodes D3 and D4, and resistor R7. The detector circuit 44 detects the audio signal and converts the signal to DC voltage. The DC voltage is used to gate the switch 30, for example a transistor Q2, ON while a conversation is taking place. While transistor Q2 is ON, there is a dead short across the timer 32, preventing the timer 32 from operating.

The timer 32 includes capacitor C10 and resistor R15. When the conversation ceases, the voltage developed by the detector circuit 44 goes to zero, transistor Q2 turns OFF, which opens the circuit allowing the timer 32 to start charging capacitor C10. Resistor R16 provides protection for transistor Q2.

When the voltage of capacitor C10 reaches the voltage preset in the second comparator 36, such as comparator IC2, the output of comparator IC2 goes high, turning ON the relay driver 38, such as a transistor Q3. The transistor Q3 energizes the relay RLY1, which disconnects the telephone 20 from the telephone line 22. The relay RLY1 connects the telephone 20 to the hold circuit 50 including diode D10, which maintains the relay RLY1 energized, holding the relay RLY1 latched, until the telephone 20 is hung up.

The off-hook disconnect and reconnect ringer device 10 is designed to be compatible with the available voltage and current on residential telephone lines. Alternatively, the off-hook disconnect and reconnect ringer device 10 may be designed to be compatible with business telephone lines. As an example, for residential usage, a telephone 20 which is off-hook has a voltage of approximately 6–10 volts. A telephone 20 which is on the hook has a voltage of approximately 48–50 volts. The first comparator 34, such as comparator IC1, is set to detect an increase in voltage so that when the telephone 20 is connected (and hung up), the output of the first comparator IC1 will go high and turn ON transistor Q2, as if a conversation is taking place. The capacitor C10 of the timer 32 is discharged and resets the timer 32 back to zero, maintaining connection of the telephone 20 to the telephone line 22.

The bridge 46 includes diodes D13, D14, D15, and D16 and the control circuit 48 includes resistors R23, R24, R25, and capacitor C8. Capacitor C8 of the control circuit 48 provides a time delay for giving relay RLY1 time to switch in completely before cancelling the timer 32 out.

Diodes D5, D6, D9, and D10 and their respective circuits are used as buffering gates to keep each circuit from interfering with each other. Diodes D7, D8, D11, D12, and resistor R14 are used for setting the proper bias. Resistors R1, R8, R11, R12, R13, R17, R20, R21, and R22 provide various impedances and diodes D1 and D2 are voltage clamps. Resistors R9 and R10 set the comparator reference voltage for comparator IC1. Resistors R18 and R19 set the reference voltage for comparator IC2. Capacitor C3 couples transformer T1 to transistor Q1. Capacitor C4 maintains DC voltage.

Capacitor C6 and resistor R5 form a decoupling circuit in the power supply 42 to stabilize the voltage to the audio amplifier 28 and during varying current due to relay RLY1 switching ON and OFF modulating the power supply, i.e. from audio feedback from ON/OFF clicking sound.

Capacitor C11 is a DC power supply filter. Capacitor C9 is a piezo coupling capacitor for passing AC voltage.

The illustrated schematic is one example of the off-hook disconnect and reconnect ringer device 10. As an alternative, each transistor may be replaced with an IC comparator. The transistor Q1 may be replaced with a high gain darlington. The relays, transistors, resistors, capacitors, and diodes may be different sizes for accomplishing the desired result from the off-hook disconnect and reconnect ringer device 10. The comparators IC1 and IC2 may be individual units or one single unit. Alternatively, the comparators IC1 and IC2 may be replaced with audio OP AMPS.

The off-hook disconnect and reconnect ringer device 10 may be a separate device attached to the telephone 20 and to the telephone line 22, such as by wires 66 and 68, respectively. Alternatively, the off-hook disconnect and reconnect ringer device 10 may be integrally formed with the telephone 20, an answering machine, or the like. If a household or business has several telephones, the off-hook disconnect and reconnect ringer device 10 may have several inputs for connection to each separate telephone. Alternatively, a separate off-hook disconnect and reconnect ringer device 10 may be hooked up to each separate telephone.

The off-hook disconnect and reconnect ringer device 10 may utilize an indicator light, such as the off-hook indicator 70, which turns on when the telephone is off-hook for visually indicating that the telephone is off-hook. As an example, the off-hook indicator 70 may be an LED device.

To utilize the off-hook disconnect and reconnect ringer device 10 which is a separate unit, the telephone line 22 and the telephone 20 are attached to the off-hook disconnect and reconnect ringer device 10 and the 12 volt power supply 42 is connected to the off-hook disconnect and reconnect ringer device 10 and then plugged into a power supplying outlet.

In operation, while the telephone 20 is in use by a person, the voice of the person is amplified by the transistor Q1. The audio signal is converted to DC voltage by the detector circuit 44, which gates the transistor Q2 ON, creating a dead short across the timer 32. A dead short across the timer 32 prevents the relay RLY1 from disconnecting the telephone 20 from the telephone line 22.

When the conversation ceases or the telephone 20 is off-hook, the voltage developed by the detector circuit 44 goes to zero, transistor Q2 turns OFF, which opens the circuit allowing the timer 32 to start charging the capacitor C10. When the voltage reaches a voltage preset in the comparator IC2, for example 8.2 volts, the output of the comparator IC2 goes high, turning ON the transistor Q3 energizing the relay RLY1, which disconnects the telephone 20 from the telephone line 22. The relay RLY1 connects the telephone 20 to the hold circuit 50 until the telephone 20 is hung up.

When the telephone 20 is hung up, the comparator IC1 is set to detect the increase in telephone-line voltage and produce a high output, turning ON transistor Q2, as if a conversation is taking place, which discharges capacitor C10 and resets the timer 32 back to zero, maintaining connection of the telephone 20 to the telephone line 22.

To receive an incoming telephone call while the off-hook disconnect and reconnect ringer device 10 has the telephone 20 disconnected from the telephone line 22, the telephone 20 may be answered by placing the telephone 20 on the hook and then answering the call. For example, the telephone may be activated mechanically by a cradle button or hook switch depending upon the type of telephone. By placing the telephone 20 on the hook, the relay hold circuit 50 is deactivated, enabling telephone 20 to be reconnected to the telephone line 22 for normal operation of the telephone 20, which in turn allows the telephone line voltage to increase causing a high output on comparator IC1 which turns ON transistor Q2 as if a conversation is taking place, resetting the timer 32 which maintains telephone reconnection or connection.

Figure 4:
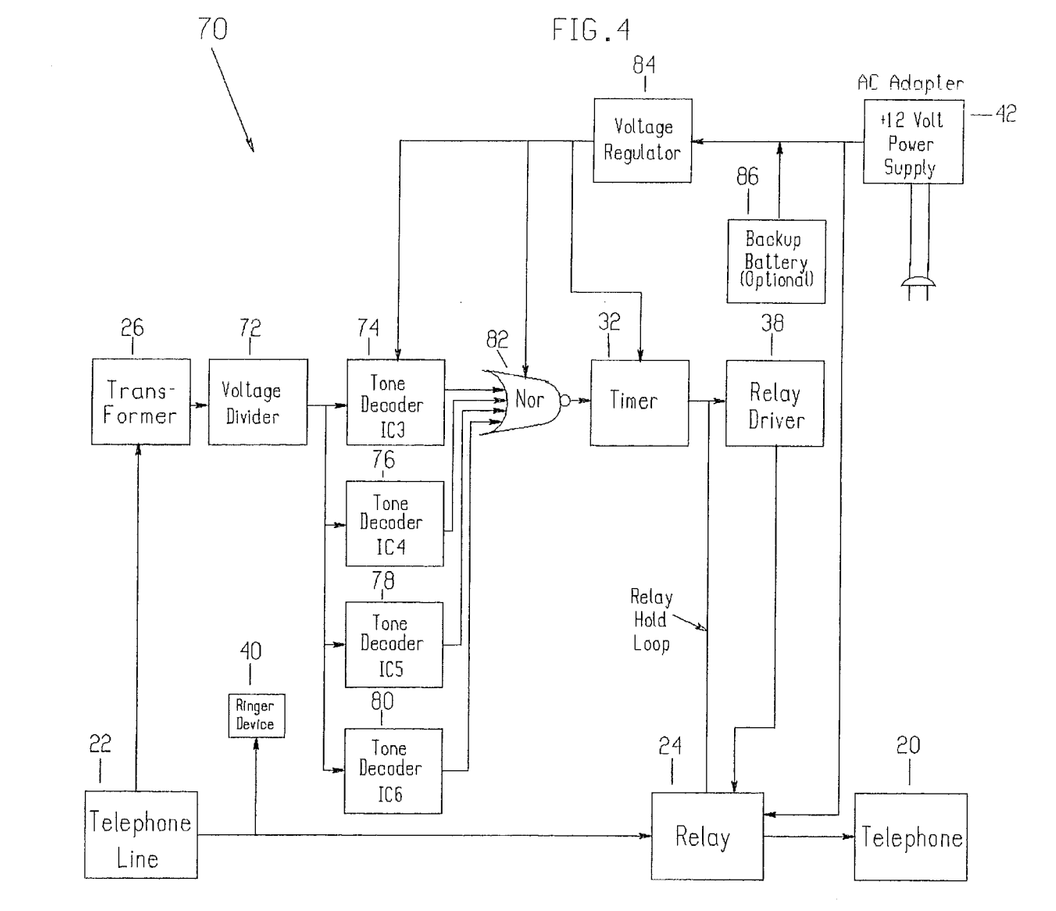
FIG. 4 is a block diagram of another alternative embodiment of the off-hook disconnect and reconnect ringer device.
Figure 5:
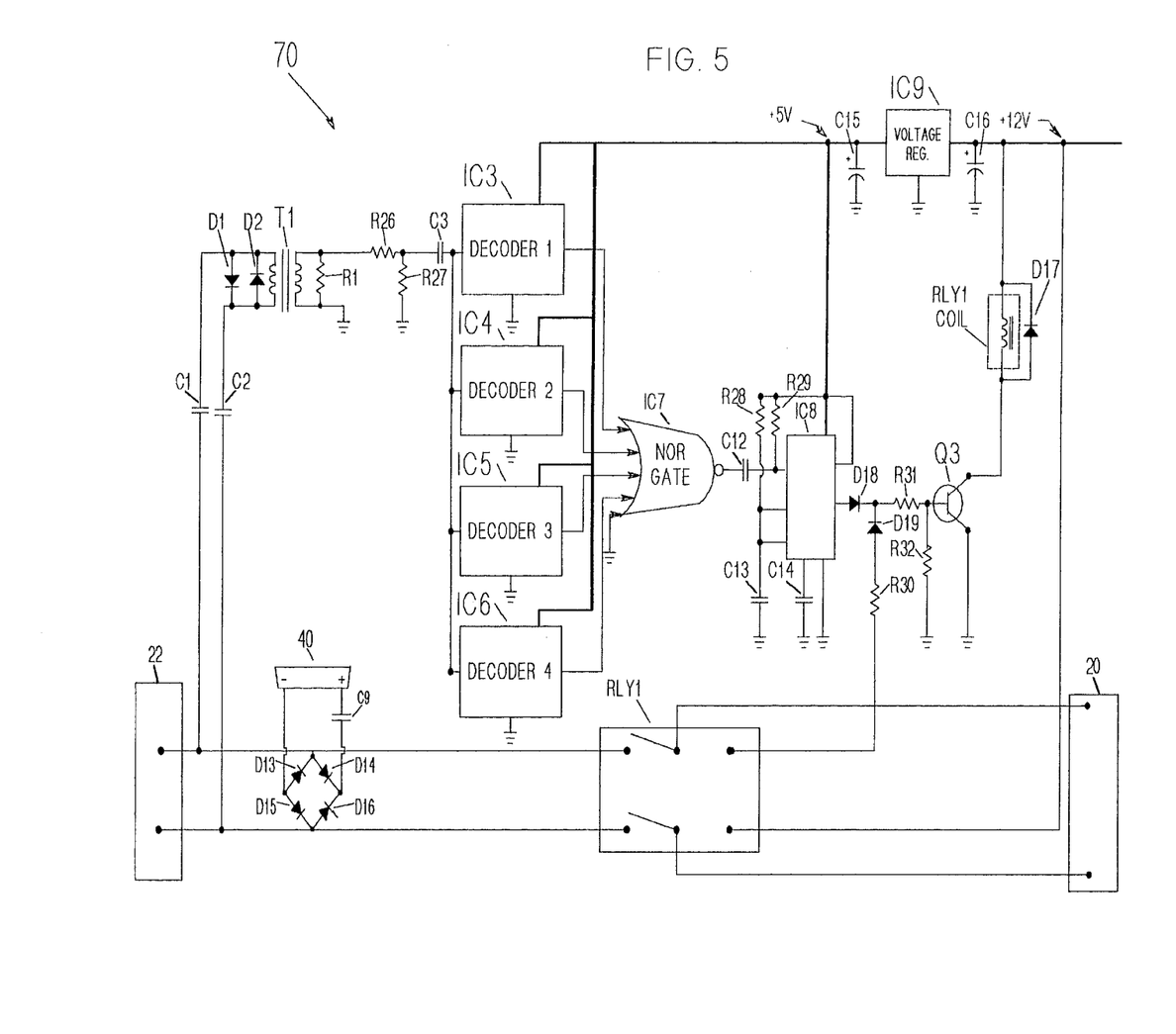
FIG. 5 is a schematic diagram of the off-hook disconnect and reconnect ringer device of FIG. 4.
Figure 6:
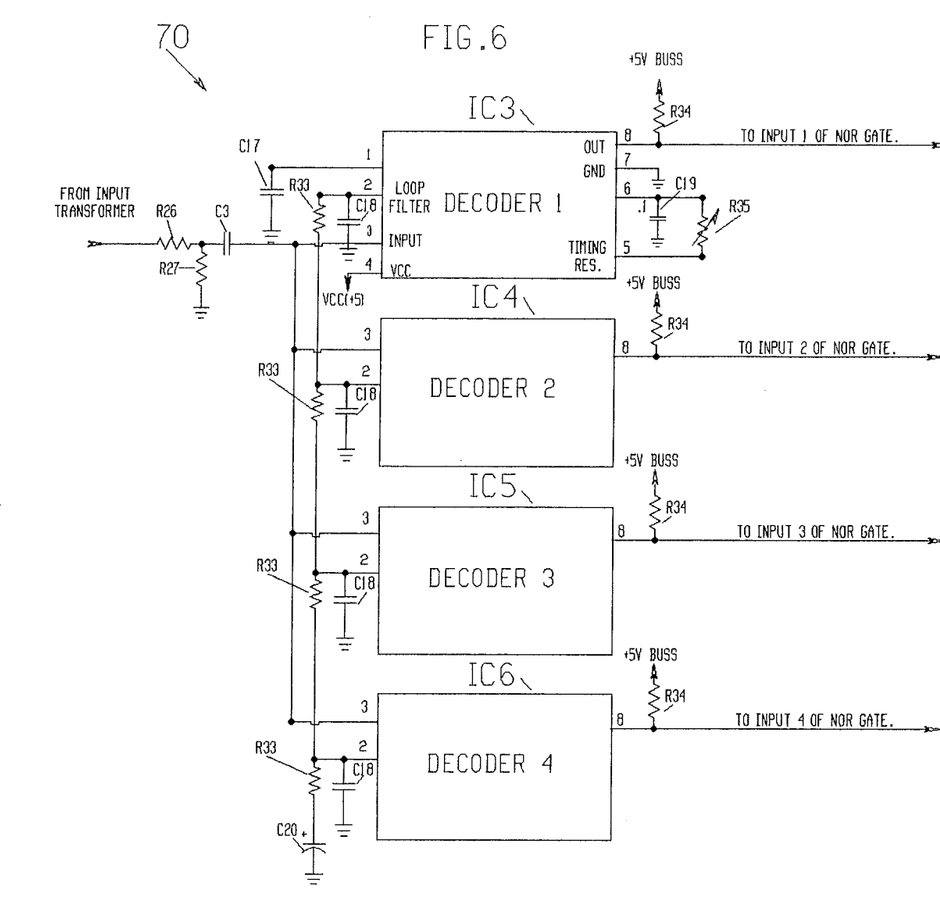
FIG. 6 is a partial schematic diagram of the off-hook disconnect and reconnect ringer device illustrating connection of an integrated circuit or tone decoder to the off-hook disconnected and reconnect ringer device.

Referring to FIGS. 4–6 and using the same reference characters to define like parts, an alternative embodiment of the off-hook disconnect and reconnect ringer device 10 as illustrated in FIGS. 1–3 may be an off-hook disconnect and reconnect ringer device 70 having like parts as the off-hook ringer device 10 and having a voltage divider 72, integrated circuits 74, 76, 78, 80 and 82, and a volt regulator 84 in place of the audio amplifier 28, the switch 30, and the first and second comparators 34 and 36.

The telephone line 22 is connected to the transformer 26, which is connected to the voltage divider 72. The voltage divider 72 is connected to the integrated circuits 74, 76, 78, and 80. The integrated circuits 74, 76, 78, and 80 are tone decoders which detect the tones produced by the telephone company when the telephone 20 has been left off of the hook.

The integrated circuits 74, 76, 78, and 80 are connected to an integrated circuit or NOR gate 82 which puts out a signal when and only when all four tones from the off-hook signal are present. The NOR gate 82 is connected to the timer 32, which is connected to the relay driver 38, the relay 24 and the telephone 20.

The voltage regulator 84 is connected to the timer 32 and integrated circuits 74, 76, 78, 80 and 82 for supplying the power that the integrated circuits require to operate. As an example, the volt regulator 84 may be a +5 volt regulator. The power supply 42 is connected to the volt regulator 84 for supplying power to the off-hook disconnect and reconnect ringer device 70. Alternatively, the off-hook disconnect and reconnect ringer device 70 may also be connected to a backup battery 86 for supplying power to the off-hook ringer device 70 during a power failure.

In operation, when the telephone 20 is on the hook or is being used in a normal manner, the relay 24 connects the telephone 20 to the telephone line 22 as normal. When the telephone 20 is off the hook, the telephone company after a period of time conveys a tone, called the off-hook tone, designed to alert a person that the telephone is off the hook, through the receiver of the telephone 20. However, if no one is at home or in the same room, the tone may not be heard.

By using the off-hook disconnect and reconnect ringer device 70, when the telephone 20 is off-hook, the off-hook tone is transmitted through the telephone line 22 to the capacitors C1 and C2, transformer T1, resistor R1, the voltage divider 72, which includes resistors R26 and R27 and a coupler, such as capacitor C3. The off-hook tone consists of four frequencies, which are detected by the integrated circuits 74, 76, 78, and 80, such as tone filters or decoders IC3, IC4, IC5, and IC6, respectively. If all four tones are present and all four decode outputs go HIGH, the integrated circuit 82, such as NOR gate IC7, output will go HI, then LOW as the off-hook tone goes ON and OFF, triggering the timer 32, such as integrated circuit IC8. As an example, the integrated circuit IC8 may be a 555 chip The timer 32 will hold HI for approximately one second to drive the base of the relay driver 38, such as the transistor Q3, through a diode gate D18. When relay RLY1 is energized, the telephone 20 is disconnected from the telephone line 22, enabling the telephone line 22 to go back to a hang-up on-hook operation and calls can then come in on the ringer device 40 of the off-hook disconnect and reconnect ringer device 70.

During this time, the telephone 20 that is off the hook, is fed a voltage from the power supply 42 through the relay 24 and through the hold circuit, including resistor R30 and diode gate D19, which in turn holds the relay 24 energized until the telephone 20 is put back on the hook.

If a telephone call comes in under this condition, the ringer device 40 will sound and the telephone 20 can be used in a normal operation by resetting the off-hook disconnect and reconnect ringer device 70. The off-hook ringer device 70 may be reset by hanging up the telephone or pressing the receiver hang-up button on the telephone 20, and then answering the telephone call.

Referring to FIG. 6, as an example, the integrated circuits IC3, IC4, IC5 and IC6 may be LM567V chips each having a tone decoder frequency of 1400 hz, 2060 hz, 2450 hz and 2600 hz, respectively. As illustrated by integrated circuit IC3, each integrated circuit is connected to an output filter, such as capacitor C17, a loop filter including resistor R33 and capacitor C18, an input from the transformer 26, and a +5 VCC for powering the integrated circuit. Each integrated circuit is also connected to an output which leads to an input of the NOR gate IC7 and to a resistor R34, such as a pull up resistor to a +5 volt buss, a ground, a timing capacitor C19, and a timing resistor R35, such as a 15 turn potentiometer for providing adjustment of the frequency. Additionally, integrated circuit IC6 is connected to a capacitor C20 for filtering.

Referring again to FIGS. 4–6, additional components of the off-hook ringer device 70 include capacitor C12 which couples the output signal from the NOR gate IC7 to the input of the timer IC8. A capacitor C13 sets the one second timing duration for the timer IC8. Capacitor IC14 is a high frequency power supply filter which prevents false triggerng of the timer IC8. Capacitors C15 and C16 are power supply filters for the +5 volt and 12 volt power supplies, respectively.

A resistor R28 is a timing resistor and resistor R29 is a pull-up resistor. Resistors R31 and R32 are bias resistors or voltage divider resistors. A diode D17 is a clamp and a diode D18 is a gate.

In addition to receiving incoming telephone calls when the telephone is off-hook, the off-hook disconnect and reconnect ringer device 10 or 70 is a safety device enabling a person to utilize devices which automatically place an outgoing telephone call, such as a device which signals a hospital that a person needs medical attention. Without the use of the off-hook disconnect and reconnect ringer device 10 or 70, if the telephone is off-hook, the outgoing telephone call will not be transferred through the telephone line.

Therefore, the invention provides an apparatus and method for detecting if a telephone is off-hook and for receiving incoming telephone calls when the telephone is off-hook.

We claim:

1. An off-hook disconnect and reconnect ringer device for a telephone connected to a telephone line of a telephone company which provides tones for warning of an off-hook condition of said telephone, comprising:

means for detecting at least one of said tones transmitted through said telephone line of said telephone which is off-hook, wherein said means for detecting said tones comprises four integrated circuits, each preset to decode a specific frequency for detecting if said telephone is off-hook:

means for producing a signal indicating that an off-hook condition of said telephone has been detected;

means for disconnecting said off-hook telephone from said telephone line after receiving said signal;

means for signaling that said off-hook disconnect and reconnect ringer device is receiving an incoming telephone call through said telephone line of said off-hook telephone;

means for electronically resetting said off-hook disconnect and reconnect ringer device for reconnecting said telephone with said telephone line for answering the incoming telephone call; and means for adjusting the frequency of said integrated circuits.

2. The off-hook disconnect and reconnect ringer device according to claim 1, further comprising:

a transformer connected to said telephone line; and a voltage divider connected between said transformer and said means for detecting.

3. The off-hook disconnect and reconnect ringer device according to claim 1, wherein said means for signaling is a ringer device.

4. The off-hook disconnect and reconnect ringer device according to claim 1, wherein said means for electronically resetting comprises a hold circuit.

5. The off-hook disconnect and reconnect ringer device according to claim 1, wherein said means for disconnecting is a relay and wherein said means for electronically resetting further comprises:

a hold circuit connected to said relay for holding said relay energized while said telephone is off-hook;

a power supply for feeding a voltage through said relay and through said hold circuit for holding said relay energized during disconnection of said off-hook telephone from said telephone line; and means for preventing voltage flow through said hold circuit for de-energizing said relay for reconnecting said telephone line and said off-hook telephone.

6. An off-hook disconnect and reconnect ringer device for a telephone, comprising:

means for connecting said off-hook disconnect and reconnect ringer device to said telephone;

means for connecting said off-hook disconnect and reconnect ringer device to a telephone line supplying telephone service;

a relay connected between said telephone and said telephone line for temporarily disconnecting and connecting said telephone and said telephone line;

at least one integrated circuit preset to decode specific frequencies transmitted through said telephone line of said telephone which is off-hook for detecting if said telephone is off-hook and for producing a signal;

a NOR gate connected to said at least one integrated circuit for receiving said signal produced by said at least one integrated circuit;

a timer connected to said NOR gate for receiving a signal from said NOR gate and timing a period of time for enabling said relay to latch;

a relay driver connected to said timer for receiving a signal from said timer and transmitting a signal to said relay for connecting and disconnecting said telephone and said telephone line;

a ringer device connected between said relay and said telephone line for signaling that said off-hook disconnect and reconnect ringer device is receiving an incoming telephone call;

a power supply connected to said off-hook disconnect and reconnect ringer device;

means for electronically resetting said off-hook disconnect and reconnect ringer device for reconnecting said telephone with said telephone line for answering an incoming telephone call; and means for adjusting the frequency of said at least one integrated circuit.

7. The off-hook disconnect and reconnect ringer device according to claim 6, wherein said means for electronically resetting comprises:

a hold circuit connected to said relay for holding said relay energized while said telephone is off-hook; and means for preventing voltage flow through said hold circuit for de-energizing said relay for reconnecting said telephone line and said off-hook telephone;

wherein said power supply feeds a voltage through said relay and through said hold circuit for holding said relay energized during disconnection of said off-hook telephone from said telephone line.

* * * * *